3,445,336
PROCESS FOR PRODUCING FLAVIN-ADENINE DINUCLEOTIDE
Masao Tanaka, Machida-shi, and Nobuo Nakamura, Tokyo, Japan, assignors to Kyowa Hakko Kogyo Co., Ltd., Tokyo, Japan, a corporation of Japan
No Drawing. Continuation-in-part of application Ser. No. 465,185, June 18, 1965. This application Jan. 23, 1968, Ser. No. 699,764
Claims priority, application Japan, June 24, 1964, 39/35,561
Int. Cl. C12d 13/06
U.S. Cl. 195—28                 15 Claims

ABSTRACT OF THE DISCLOSURE

A process for producing flavin-adenine dinucleotide by fermentation which comprises culturing a flavin-adenine dinucleotide-producing microorganism belonging to the genus Brevibacterium, Flavobacterium, Micrococcus or Corynebacterium in an aqueous nutrient medium under aerobic conditions in the presence of at least one precursor of flavin-adenine dinucleotide. Precursors which may be employed include pyrimidine base precursors such as cytosine, thymine and uracil, purine base precursors such as adenine, guanine, hypoxanthine and xanthine, lumazine and derivatives thereof, ribityl derivatives of these precursors, riboflavin and flavin mononucleotide.

---

The present application is a continuation-in-part of application Ser. No. 465,185, filed in the United States Patent Office on June 18, 1965 and now abandoned.

This invention relates to a process for producing flavin-adenine dinucleotide. More particularly, it relates to a process for the production of flavin-adenine dinucleotide by fermentation. Even more particularly, the invention relates to a process for the production of flavin-adenine dinucleotide by fermentation with microorganisms belonging to the genera Brevibacterium, Micrococcus, Corynebacterium and Flavobacterium.

Flavin-adenine dinucleotide (FAD), the prosthetic group D-amino acid oxidase, is riboflavin 5'-adenosine diphosphate. This compound has a very important role as a coenzyme of various enzymic reactions in living cells. As is well known in the art, flavin-adenine dinucleotide is the biochemically active form of vitamin $B_2$, riboflavin, and has recently been used in great quantities for various purposes in place of riboflavin, such as in drugs and as fillers for various foods and feeds. Flavin-adenine dinucleotide is of much practical utility in this regard because of its ease and readiness of treatment based on its biochemically strong activity, its high solubility in water, etc.

Heretofore, extraction of flavin-adenine dinucleotide from living bodies or cells and the synthesis thereof from riboflavin have been used as methods for its production. On an industrial scale, a process involving extraction from cultured cell bodies of *Eremothecium ashbyii*, which is a riboflavin-producing microorganism, has been employed because it was considered that this was the most economical method. However, in the production of flavin-adenine dinucleotide by the use of *Eremothecium ashbyii*, it has been noted that this microorganism accumulates flavin-adenine dinucleotide in the cell bodies during the early stages in the culturing thereof and, as time passes, the flavin-adenine dinucleotide so produced is decomposed to riboflavin through flavin mononucleotide. Therefore, it is difficult to obtain flavin-adenine dinucleotide in high purity and yield in the culture liquor with this process. Moreover, there have been other problems in carrying out the latter-mentioned process from the point of view of the extraction of the flavin-adenine dinucleotide from the cell bodies, its separation from other flavin compounds and so on.

One of the objects of the present invention is to provide an improved process for the production of flavin-adenine dinucleotide which overcomes the disadvantages and deficiencies of the prior art methods.

Another object of the present invention is to provide a process for producing flavin-adenine dinucleotide by fermentation which may be carried out in an efficacious and simple manner.

A further object of the invention is to provide a process for producing flavin-adenine dinucleotide by fermentation which gives the product in high purity and good yield.

A still further object of the invention is to provide a process for producing flavin-adenine dinucleotide by fermentation which may be carried out advantageously on an industrial scale at low cost to give a high yield of product.

These and other objects of the present invention will become apparent to those skilled in the art from a reading of the following specification and claims.

As the result of much research on a process for producing flavin-adenine dinucleotide by fermentation methods with microorganisms, the present inventors, in accordance with the present invention, have found that remarkable amounts of flavin-adenine dinucleotide are accumulated in the culture medium if bacteria belonging to the genera Brevibacterium, Micrococcus, Corynebacterium and Flavobacterium are cultured in a culture medium wherein compounds or mixtures of compounds which are the precursors of flavin-adenine dinucleotide are added to the medium at any time during said culturing. By the use of this procedure, flavin mononucleotide or riboflavin are barely produced in the culture medium, whereas large amounts of the desired flavin-adenine dinucleotide are produced therein.

Hence, in accordance with the present invention, it has been found that an efficacious fermentation method for producing flavin-adenine dinucleotide is effected by conducting the appropriate culture in a culture medium to which is added the precursors of flavin-adenine dinucleotide, either singly or in mixtures of two or more, at any time during the culturing, utilizing bacteria belonging to the genera Brevibacterium, Micrococcus, Corynebacterium and Flavobacterium as the microorganisms.

As for the composition of the culture medium, either a synthetic medium or a natural nutrient medium is suitable as long as it contains the essential nutrients for the growth of the microorganisms employed. Such nutrients are well known in the art and include substances such as a carbon source, a nitrogen source, inorganic compounds and the like which are utilized by the bacterium employed in appropriate amounts. Thus, as a carbon source, there may be mentioned, by way of example, carbohydrates such as glucose, starch hydrolysates, molasses, etc., or any other conventional carbon source. These substances may be used either singly or in mixtures of two or more. As a nitrogen source, various kinds of inorganic or organic salts or compounds, such as urea or ammonium salts such as ammonium chloride, ammonium nitrate, etc., or natural substances containing nitrogen, such as cornsteep liquor, yeast extract, meat extract, peptone, fish meal, etc., may be employed. Again these substances are utilizable either singly or in combinations of two or more. Inorganic compounds which may be added to the culture medium include potassium phosphate, magnesium sulfate, potassium chloride, etc. If strains having specific nutrition requirements are employed, the compounds needed to satisfy these particular requirements for growth should, of course, be also added to the culture medium.

As for the precursors of flavin-adenine dinucleotide to be added to the culture medium in accordance with the present invention, these include one or more than one of the following: pyrimidine bases that are known as precursors in the biosynthesis of riboflavin such as cytosine, thymine, uracil or other such pyrimidine derivatives; purine bases such as adenine, guanine, hypoxanthine, xanthine or other such purine derivatives; lumazine or the derivatives thereof such as dimethyllumazine, hydroxymethyllumazine, etc.; and the ribityl derivatives of these substances such as 4-ribitylamino-5-aminouracil, 6,7-dimethylribolumazine, 6 - methyl-7-hydroxyribolumazine, etc. and the like. Of course, riboflavin and flavin mononucleotide, which are precursors closer to the actual final molecular structure of flavin-adenine dinucleotide than the aforementioned compounds, are similarly effective as additives in the process of the present invention.

Even if the said precursor compounds are produced in the culture medium itself, depending upon the characteristics of the particular strains of bacteria employed, or natural substances containing these compounds are present in the medium, e.g., natural substances containing purine or pyrimidine bases or riboflavin or the culture liquor of the bacteria producing these precursors, etc., they nevertheless have beneficial and good effects on the formation of flavin-adenine dinucleotide when additionally added to the culture medium.

The fermentation employed herein to obtain the flavin-adenine dinucleotide is conducted under aerobic conditions, such as aerobic shaking of the culture or with stirring of a submerged culture, at a temperature of about 20° to 40° C. and at a pH of about 5.5 to 9.0. After two to eight days of culturing under these conditions, large amounts of flavin-adenine dinucleotide are found to be accumulated in the culture medium. Small amounts of flavin-adenine dinucleotide are also found in the cell bodies themselves.

When precursors besides riboflavin or flavin mononucleotide are employed, only very small amounts of riboflavin and flavin mononucleotide are found to be produced in the culture medium.

After the completion of fermentation, the flavin-adenine dinucleotide is separated from the fermentation filtrate by conventional means, such as ion exchange resin treatment, extraction with solvents, precipitation with metallic salts, chromatography or the like.

The following examples are given merely as illustrative of the present invention and are not to be considered as limiting. Unless otherwise noted, the percentages therein are by weight.

EXAMPLE I

A seed bacterium of *Brevibacterium ammoniagenes* ATCC 6872 is cultured in a sterilized culture medium containing 2% glucose, 1% peptone, 1% yeast extract and 0.25% of NaCl for 25 hours at 30° C.

This culture liquor is inoculated into a fermentation medium in the amount of 10% thereof by volume. Aerobic shaking of the culture is then carried out at 30° C.

The fermentation medium has the following composition (per liter of water).

| | |
|---|---|
| Glucose _____ g__ | 100 |
| Urea _____ g__ | 6 |
| $KH_2PO_4$ _____ g__ | 10 |
| $K_2HPO_4$ _____ g__ | 10 |
| $MgSO_4 \cdot 7H_2O$ _____ g__ | 10 |
| $CaCl_2 \cdot 2H_2O$ _____ g__ | 0.1 |
| Calcium pantothenate _____ mg__ | 10 |
| Thiamine hydrochloride _____ mg__ | 2 |
| Biotin _____ μg__ | 30 |

The fermentation medium is prepared as follows:
250 ml. conical flasks each containing 19 ml. of an aqueous solution of the components other than urea are sterilized in an autoclave under a pressure of about 1 kg./cm.$^2$ for 15 minutes. On the other hand, a 12% solution of urea is prepared and sterilized. One ml. portions of the urea solution are then added to the conical flasks prior to the inoculation thereinto of the above-mentioned seed culture.

After fermentation has continued for 48 hours, hypoxanthine is added to the fermentation liquor in the amount of 2 mg. per ml. of liquor. The culture is then continued for another 48 hours. After this time, it is found that 65 micrograms per ml. of flavin-adenine dinucleotide is accumulated in the fermentation liquor. (Only 20 micrograms per ml. of flavin-adenine dinucleotide is accumulated if hypoxanthine is not added to the medium employed in this example.) The product is then separated from the liquor by a conventional ion exchange resin treatment.

EXAMPLE II

A fermentation process is carried out in the same way as that described in Example I except that adenine in the amount of 1 mg./ml. of fermentation liquor instead of hypoxanthine is added to the fermentation liquor. A yield of 89 micrograms per ml. of flavin-adenine dinucleotide is found to be accumulated in the fermentation liquor at the end of the fermentation.

EXAMPLE III

A fermentation is carried out in the same way as Example I except that 1 mg./ml. of uracil is added to the fermentation medium instead of hypoxanthine. As a result, 49 micrograms of flavin-adenine dinucleotide per ml. of fermentation liquor is found to be accumulated in the liquor.

EXAMPLE IV

The same culturing or fermentation process as that described in Example I is carried out except that 0.1 mg./ml. of flavin mononucleotide and 0.5 mg./ml. of adenine in lieu of hyproxanthine is employed as the additive. A yield of 295 micrograms per ml. of flavin-adenine dinucleotide is obtained in the fermentation liquor.

EXAMPLE V

The same culture as that described in Example I is conducted but with the use of *Brevibacterium linens* ATCC 9175 instead of *Brevibacterium ammoniagenes* as the seed bacterium. Hypoxanthine is added to the fermentation liquor in the amount of 2 mg./ml. 35 micrograms per ml. of flavin-adenine dinucleotide is found to be accumulated in the fermentation liquor.

EXAMPLE VI

A culture is conducted similarly as described in Example I. By using a strain of bacteria belonging to *Micrococcus freudenreichii* ATCC 8459 as the seed bacterium and adding hypoxanthine in the amount of 2 mg./ml. of fermentation liquor to the medium, it is found that 55 micrograms per ml. of flavin-adenine dinucleotide is accumulated in the fermentation liquor.

EXAMPLE VII

As the seed bacterium, a strain belonging to *Micrococcus sodonensis* ATCC 15932 is cultured in a culture medium containing 2% glucose, 1% peptone, 1% yeast extract and 0.25% NaCl at 30° C. for 24 hours. The resultant culture liquor in the amount of 10% (by volume) is inoculated into the same fermentation medium as that described in Example I. Adenine instead of hypoxanthine in the amount of 1 mg./ml. is added to the fermentation liquor after 48 hours. After another 72 hours of culturing, 94 micrograms per ml. of flavin-adenine dinucleotide is found to be accumulated in the fermentation liquor.

EXAMPLE VIII

The same culture as that described in Example I is conducted but with the use of *Corynebacterium aceto-*

*glutamicum* ATCC 15806 as the seed bacterium. As the additive in accordance with the present invention, 2 mg./ml. of xanthine is added to the fermentation liquor. The resultant yield of flavin-adenine dinucleotide in the fermentation liquor is 53 micrograms per ml. of liquor.

EXAMPLE IX

The same culture as that described in Example I is conducted except with the use of *Corynebacterium hydrocarboclastus* ATCC 15592 as the seed bacterium. Moreover, instead of hypoxanthine, 1 mg./ml. of thymine is added to the fermentation medium. 48 micrograms per ml. of flavin-adenine dinucleotide is found to be accumulated in the fermentation liquor.

EXAMPLE X

The same culture as that described in Example I is conducted except that *Flavobacterium arborescens* ATCC 4358 instead of *Brevibacterium ammoniagenes* ATCC 6872 is employed as the seed bacterium. At the end of the fermentation, it is found that 39 micrograms per ml. of flavin-adenine dinucleotide is accumulated in the fermentation liquor.

EXAMPLE XI

The same culture as that described in Example I is conducted but with the use of *Flavobacterium devorans* ATCC 10829 as the seed bacterium. The yield of flavin-adenine dinucleotide accumulated in the fermentation liquor is 51 micrograms per ml. of liquor.

Further, only 10 to 20 micrograms per ml. of flavin-adenine dinucleotide is accumulated if precursors are not added to the medium employed in Examples 2 to 11.

EXAMPLE XII

The four strains *Brevibacterium ammoniagenes* ATCC 6872, *Micrococcus sodonensis* ATCC 15932, *Corynebacterium acetoglutamicum* ATCC 15806 and *Flavobacterium arborescens* ATCC 4358 are each cultured under the same culturing conditions as described in Example I. After 48 hours of culturing, the amounts of riboflavin shown in Table 1, being sterilized appropriately, are added to the culture medium instead of hypoxanthine. Culturing is then continued for another 48 hours. As a result, from 13.6 to 238 γ/ml. of flavin-adenine dinucleotide are produced, as shown in Table 1.

TABLE 1

| Strain | Amount of riboflavin added | Amount of flavin-adenine dinucleotide produced |
|---|---|---|
| *Brevibacterium ammoniagenes* ATCC 6872 | 250 γ/ml. 0 | 137.4 γ/ml. 23.5 |
| *Micrococcus sodonensis* ATCC 15982 | 500 γ/ml. 0 | 215 γ/ml. 19.8 |
| *Corynebacterium acetoglutamicum* ATCC 15806 | 500 γ/ml. 0 | 238 γ/ml. 13.3 |
| *Flavobacterium arborescens* ATCC 4358 | 500 γ/ml. 0 | 136.5 γ/ml. 17.7 |

When culturing is conducted without the addition of riboflavin to the medium, flavin-adenine dinucleotide is produced only in the amount of 25 γ/ml. at best by any of the strains.

EXAMPLE XIII

As in Example XII, *Brevibacterium ammoniagenes* ATCC 6872, *Micrococcus sodonensis* ATCC 15932, *Corynebacterium acetoglutamicum* ATCC 15806 and *Flavobacterium arborescens* ATCC 4358 are each cultured under the conditions and in the same medium as descibed in Example I. 250 γ/ml. of flavin mononucleotide is added to the medium, instead of riboflavin. Eighteen to 48 hours after the addition of this precursor, the amount of flavin-adenine dinucleotide in the culture liquor reaches a maximum. The amounts of flavin-adenine dinucleotide produced with the different strains are shown in Table 2.

Table 2

| Strain: | Amount of flavin-adenine dinucleotide produced |
|---|---|
| *Brevibacterium ammoniagenes* ATCC 6872 | γ/ml. 325 |
| *Micrococcus sodonensis* ATCC 15932 | γ/ml. 227 |
| *Corynebacterium acetoglutamicum* ATCC 15806 | γ/ml. 209 |
| *Flavobacterium arborescens* ATCC 4358 | γ/ml. 129 |

EXAMPLE XIV

*Brevibacterium ammoniagenes* ATCC 6872 is cultured in the nutrient medium shown in Example I. After 72 hours of culturing, riboflavin and adenine are added in an amount of 500 γ/ml. each, respectively. Culturing is then continued for an additional 48 hours. As a result, 325 γ/ml. of flavin-adenine dinucleotide is accumulated in the culture liquor.

The invention being thus described, it will be obvious that the same may be varied in many ways. Such variations are not to be regarded as a departure from the spirit and scope of the invention and all modifications are intended to be included within the scope of the following claims.

We claim:

1. In a fermentation process for the production of flavin-adenine dinucleotide by culturing a flavin-adenine dinucleotide-producing microorganism belonging to a genus selected from the group consisting of Brevibacterium, Flavobacterium, Micrococcus and Corynebacterium in an aqueous nutrient medium under aerobic conditions and recovering the flavin-adenine dinucleotide thus produced, the improvement which comprises adding to said medium at least one precursor of flavin-adenine dinucleotide selected from the group consisting of cytosine, thymine, uracil, adenine, guanine, hypoxanthine, xanthine, riboflavin and flavin mononucleotide.

2. A process for producing flavin-adenine dinucleotide which comprises culturing a flavin-adenine dinucleotide-producing microorganism belonging to a genus selected from the group consisting of Brevibacterium, Flavobacterium, Micrococcus and Corynebacterium in an aqueous nutrient medium under aerobic conditions in the presence of at least one member selected from the group consisting of pyrimidine bases, purine bases, riboflavin and flavin mononucleotide, and recovering the flavin-adenine dinucleotide thus produced.

3. The process of claim 2, wherein the pyrimidine base is selected from the group consisting of cytosine, thymine and uracil.

4. The process of claim 2, wherein the purine base is selected from the group consisting of adenine, guanine, hypoxanthine, and xanthine.

5. A process for producing flavin-adenine dinucleotide which comprises culturing a flavin-adenine dinucleotide-producing microorganism belonging to a genus selected from the group consisting of Brevibacterium, Flavobacterium, Micrococcus and Corynebacterium in an aqueous nutrient medium under aerobic conditions at a temperature of about 20° to 40° C. and a pH of about 5.5 to 9.0 in the presence of at least one member selected from the group consisting of pyrimidine bases, purine bases, riboflavin and flavin mononucleotide, and recovering the flavin-adenine diculeotide thus produced.

6. The process of claim 5, wherein the pyrimidine base is selected from the group consisting of cytosine, thymine and uracil.

7. The process of claim 5, wherein the purine base is selected from the group consisting of adenine, guanine, hypoxanthine and xanthine.

8. The process of claim 5, wherein said microorganism is *Brevibacterium ammoniagenes* ATCC 6872.

9. The process of claim 5, wherein said microorganism is *Brevibacterium linens* ATCC 9175.

10. The process of claim 5, wherein said microorganism is *Micrococcus freudenreichii* ATCC 8459.

11. The process of claim 5, wherein said microorganism is *Micrococcus sodonensis* ATCC 15932.

12. The process of claim 5, wherein said microorganism is *Corynebacterium acetoglutamicum* ATCC 15806.

13. The process of claim 5, wherein said microorganism is *Corynebacterium hydrocarboclastus* ATCC 15592.

14. The process of claim 5, wherein said microorganism is *Flavobacterium arborescens* ATCC 4358.

15. The process of claim 5, wherein said microorganism is *Flavobacterium devorans* ATCC 10829.

References Cited

UNITED STATES PATENTS

| | | |
|---|---|---|
| 2,973,305 | 2/1961 | Masuda et al. |
| 3,211,629 | 10/1965 | Abe et al. |
| 3,232,844 | 2/1966 | Kinoshita et al. |

ALVIN E. TANENHOLTZ, *Primary Examiner.*

U.S. Cl. X.R.

195—82